US007240030B2

(12) United States Patent
Velez et al.

(10) Patent No.: US 7,240,030 B2
(45) Date of Patent: Jul. 3, 2007

(54) METHOD AND SYSTEM FOR ALLOCATING ASSETS IN EMERGING MARKETS

(75) Inventors: Deborah A. Velez, New York, NY (US); Marco Santamaria, Larchmont, NY (US); Gawaine Lewis, London (GB)

(73) Assignee: American International Group, Inc., New York, NY (US)

( * ) Notice: Subject to any disclaimer, the term of this patent is extended or adjusted under 35 U.S.C. 154(b) by 709 days.

(21) Appl. No.: 09/948,109

(22) Filed: Sep. 5, 2001
(Under 37 CFR 1.47)

(65) Prior Publication Data
US 2003/0004849 A1  Jan. 2, 2003

Related U.S. Application Data

(60) Provisional application No. 60/233,958, filed on Sep. 20, 2000.

(51) Int. Cl.
*G06Q 40/00* (2006.01)
(52) U.S. Cl. .................... 705/36 R; 705/37
(58) Field of Classification Search ............ 705/14–36
See application file for complete search history.

(56) References Cited

U.S. PATENT DOCUMENTS 5,704,045 A * 12/1997 King et al. ................ 705/35
6,064,985 A    5/2000 Anderson ................. 705/36
6,078,904 A * 6/2000 Rebane .................... 705/36
6,092,056 A    7/2000 Tull, Jr. ................... 705/36
6,240,399 B1 * 5/2001 Frank et al. ............... 705/36

FOREIGN PATENT DOCUMENTS

EP   0 448 800 A1 * 10/1991
JP   2003016274 A * 1/2003

OTHER PUBLICATIONS

LSEcrefsa "Centre for Research into Economics and Finance in Southern Africa", Quarterly Review, Jul. 1997.*
"International Banking and Financial Market Developments"; Quarterly Review; Nov. 1998; pp. 1-2.

* cited by examiner

*Primary Examiner*—Frantzy Poinvil
(74) *Attorney, Agent, or Firm*—Proskauer Rose LLP

(57) ABSTRACT

In the present invention, a system and method is described for allocating portfolio assets in an emerging market, where the portfolio initially includes substantially all fixed income securities or substantially all equities. Specifically, a yield spread is periodically determining between a first fixed income instrument and a second fixed income instrument. A mean spread is determined based on the determined yield spread over a selected period of time. A band above and below the mean spread is defined over the selected period of time, where the band has an upper limit above the mean spread and a lower limit below the mean spread. Fixed income securities, in the investment portfolio, are switched for equities when a current determined yield spread exceeds the upper limit of the band. Similarly, equities, in the portfolio, are switched for fixed income securities when the current determined yield spread falls below the lower limit of the band.

24 Claims, 2 Drawing Sheets

METHOD AND SYSTEM FOR ALLOCATING ASSETS IN EMERGING MARKETS

RELATED APPLICATION

This application is based upon and claims the benefit of U.S. provisional application Ser. No. 60/233,958, filed on Sep. 20, 2000 for Deborah A. Velez, Marco Santamaria, and Gawaine Lewis entitled "METHOD FOR ALLOCATING ASSETS IN EMERGING MARKETS." The contents of this provisional application are fully incorporated herein by reference.

FIELD OF THE INVENTION

The present invention relates to the management of an investment portfolio made up of financial instruments. In particular, the present invention relates to a method for allocating assets in such an investment portfolio between equities (e.g., stocks) and fixed income securities (e.g., sovereign bonds) of an emerging market country.

BACKGROUND OF THE INVENTION

Emerging markets are defined as the financial markets of developing economies. Approximately 45 countries are classified as emerging markets. For example, emerging markets are found in regions such as Latin America (Argentina, Brazil, Chile, Columbia, Mexico, Peru, etc.), Central and Eastern Europe (Greece, Hungary, Poland, Russia, etc.), the Mideast (Israel, Turkey, etc.), Asia (China, India, Indonesia, Thailand, Malaysia, etc.), and Africa (Egypt, South Africa, Nigeria, etc.)

Improved government and market-oriented management in such emerging countries are expected to provide economic benefits over the long term. Such benefits include long-term economic growth in a non-hyper-inflationary environment, and a strong demand for goods and services from an under-served and growing population.

However, recent experiences regarding the management of equities (e.g., common stocks) and fixed income (e.g., bonds, preferred stock or debt) instruments of emerging countries are somewhat inconsistent with the above described long term expectations and goals. This inconsistency occurs for many reasons. For example, economic and political developments do not follow a linear process. Further, "growing pains" have translated into significant economic and financial market volatility. In addition, traditional equity and fixed-income vehicles have not performed as would have been hoped.

Nevertheless, the fundamental themes for investing in emerging markets remain intact. However, investors would best be served by an investment vehicle that exploits the most desirable characteristics of both fixed income instruments and equity instruments. Such characteristics include strong capital appreciation potential of equities in a "benign" or stable environment, and defensive attributes of local and foreign currency bond instruments in a "hostile" or risky environment. A balanced product also provides access to a greater variety of markets than would be available with bond or equity vehicles alone.

In view of the foregoing, it is an object of the present invention to provide a method of investing in the equities and sovereign bonds of emerging countries. This method may further be applied to allocating investments between equities and sovereign bonds of individual countries in a fund comprised of the financial instruments of a plurality of emerging countries.

SUMMARY OF THE INVENTION

The present invention seeks to add value primarily through asset allocation shifts between emerging market sovereign bonds and emerging market equities within individual countries. These asset allocation shifts are determined in the inventive method by changes in the sovereign yield spread over time. The sovereign yield spread is the spread (or difference in yield) in basis points between a U.S. Government bond and a selected benchmark dollar-denominated sovereign bond issued by the Government of an emerging market country. In the realm the bond market, a basis point (bps) is the smallest measure used for quoting yields. Each percentage point of yield in bonds equals 100 bps.

In the inventive method, the sovereign yield spread is measured over a rolling historical predetermined period in the range, e.g., of one to six months to determine a mean spread. Next, a band is defined above and below this mean by, e.g., 1 to 2 standard deviations, such as 1.7, 1.5, or 1.2 standard deviations.

When the actual current yield spread of a particular benchmark sovereign bond surpasses the upper band, we define this as a "hostile" environment and the portfolio moves into fixed income securities in that particular country. Generally, widening yield spreads signal that investors perceive rising risk. When the actual current yield spread surpasses the lower band, we define this as a "benign" environment and the portfolio moves into equity in that particular country. Tightening yield spreads generally signal that investors have become more risk tolerant. When the actual current yield spread stays within the upper and lower band, the type of security (either fixed income or equities) remains unchanged.

Preferably, in any particular country, the asset allocation in each portfolio will be substantially 100% fixed income or substantially 100% equities. In the case of a fund made up of financial instruments of a group of emerging countries, the securities for each individual country will preferably be substantially 100% fixed income or substantially 100% equities.

Within the emerging market equity universe, stocks may be chosen in accordance with established well-known methods that are currently being applied to global emerging market equity portfolios. Similarly, once a fixed income signal is given, securities may be chosen in accordance with existing security selection processes.

Such objects and advantages listed above are merely illustrative and not exhaustive. Further, these and other features and advantages of the present invention will become more apparent from the accompanying drawings and the following detailed description.

BRIEF DESCRIPTION OF THE DRAWING

The following detailed description, given by way of example and not intended to limit the present invention solely thereto, will best be understood in conjunction with the accompanying drawings, in which.

DETAILED DESCRIPTION OF THE INVENTION

Figure 1:
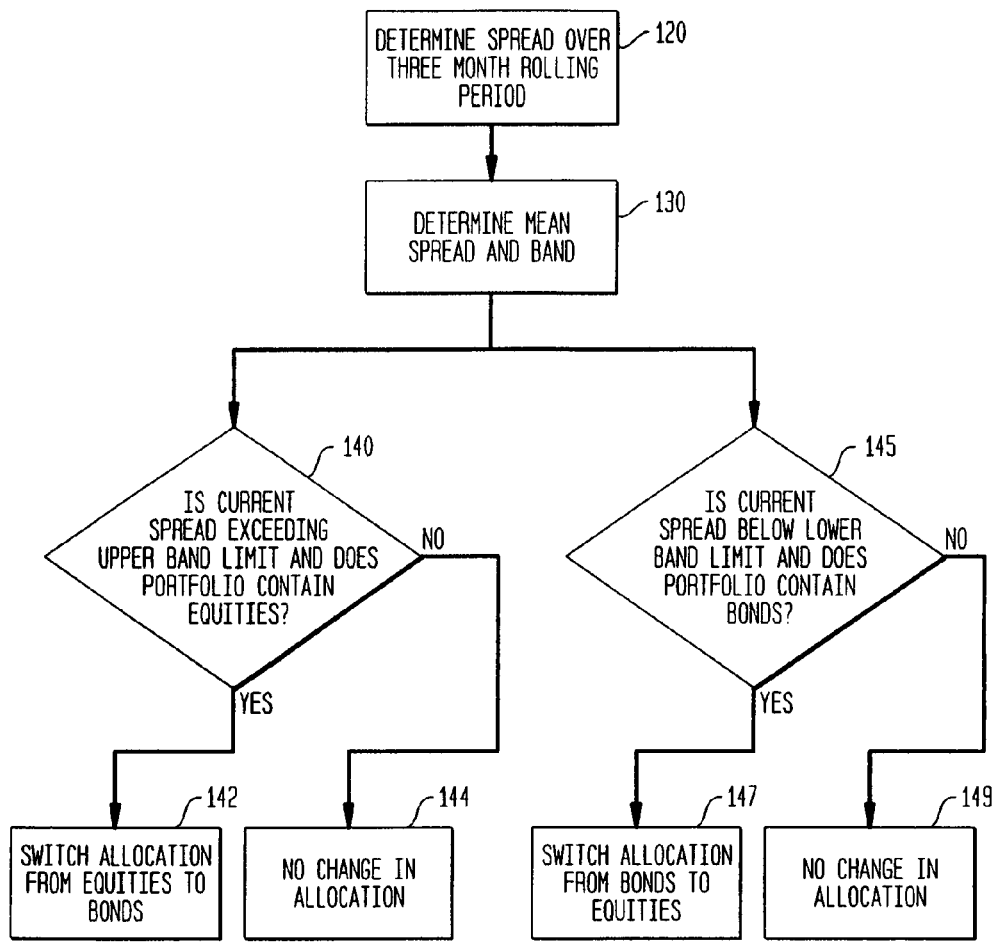
FIG. 1 schematically illustrates a flow-chart for determining the allocation of assets between stocks and bonds of an emerging country, in accordance with the present invention. Illustratively, this process may be carried out for the securities of each country in a fund of securities from multiple emerging countries.
Figure 1A:
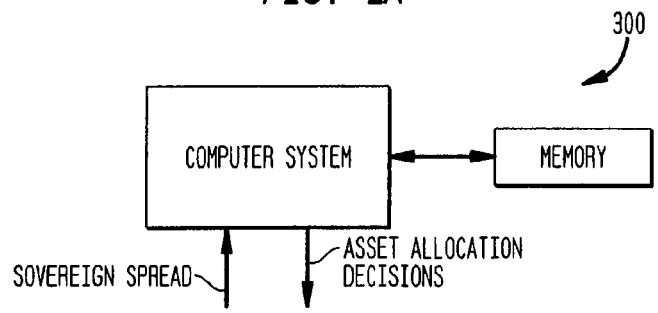
FIG. 1A schematically illustrates a computer system used to determine the allocation of assets based on the process of FIG. 1, in accordance with the present invention.

Turning to FIG. 1, an asset allocation method of the present invention is schematically illustrated in a flow chart which represents a process that may be carried out by a digital computer such as the computer system 300 of FIG. 1A.

To utilize the method of the invention, a benchmark dollar denominated sovereign bond in a particular emerging market country is selected. For example, the so called "C-Bond" is Brazil's benchmark sovereign bond. The benchmark sovereign bond has a maturity of, for example, one year or three years. In addition, a U.S. Government bond, having a maturity comparable to that of the benchmark sovereign bond, is selected.

Referring to FIG. 1, the spread in market yield (i.e., the yield spread) between the U.S. Government bond and the benchmark sovereign bond is determined on a periodic basis (e.g. daily or weekly) in step 120. Illustratively, this determination is made by the computer system and memory 300 in response to inputting the yields of the bonds, as shown in FIG. 1A. In step 130, the mean spread is determined over a rolling historical predetermined period. For example, the predetermined period may be in the range of one to six months, such as three months. A band is then defined above and below the mean. For example, the upper limit of the band is above the mean in the range of 1 to 2 standard deviations, such as 1.7, 1.5 or 1.2 standard deviations. The lower limit of the band is in the range of 1 to 2 standard deviations, such as 1.7, 1.5 or 1.2 standard deviations below the mean. The determination of the rolling mean spread and band limits are illustratively made by the computer system and memory 300.

Steps 140 and 145, as well as steps 142, 144, 147, and 149, of FIG. 1 describe the asset allocation decision. These steps may also be evaluated by computer system and memory 300 which then outputs an investment allocation decision, as shown in FIG. 1A.

According to an embodiment of the invention, the portfolio for a particular country is preferably either substantially 100% fixed income securities (such as bonds) or substantially 100% equities (such as common stock). As indicated by steps 140, 142, and 144, if the current spread exceeds the upper limit (i.e., is in a hostile environment) and the portfolio for the particular country consists of equities, a switch is made to fixed income instruments. Otherwise, no change is made. As indicated by steps 145, 147, and 149, if the current spread falls below the lower limit (i.e., is in a benign environment) and the portfolio consists of fixed income instruments, a switch is made to equities securities. Otherwise, no change is made.

Figure 2:
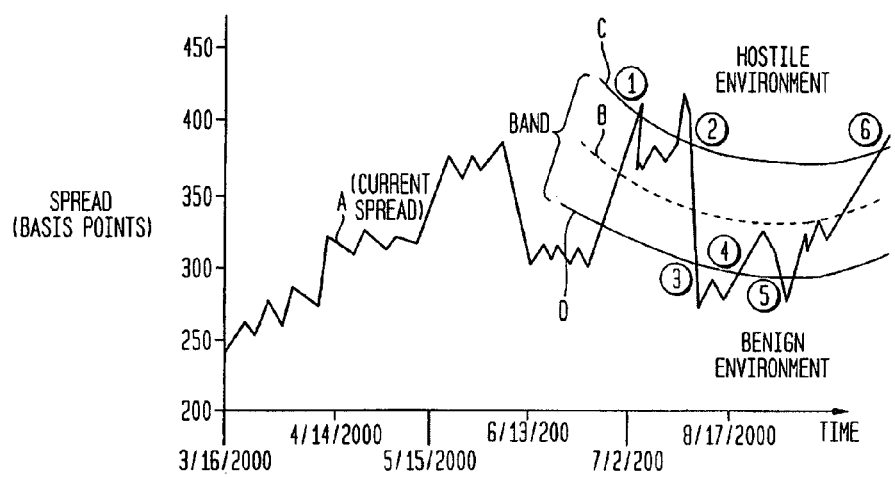
FIG. 2 is a graph which illustrates how asset allocation is switched between equities and bonds of a particular emerging country in accordance with the present invention.

FIG. 2 illustrates an example of the invention by way of a graph. The horizontal axis of the graph is time starting from a certain date, e.g. Mar. 16, 2000. The vertical axis of the graph is basis points. Curve A in the graph is the yield spread between the U.S. government bond and the benchmark sovereign bond plotted as a function of time, starting from Mar. 16, 2000. Curve B is the mean of the spread calculated over a rolling three-month historical period. Curve C is the upper limit of a band, 1.2 standard deviations above the mean. Curve D is the lower limit of the band, 1.2 standard deviations below the mean. Above curve C, the environment is "hostile." Below curve D, the environment is "benign."

Assume that the portfolio starts at time 1 and the spread is in a hostile environment. As the current spread is above the upper limit, the portfolio is set up with 100% fixed income securities. At point 2, the current spread goes below the upper limit; however, no change in asset allocation is made (see step 144). At point 3, the current spread goes below the lower limit and is in a benign environment. At this point, the portfolio allocation is switched to 100% equities (see step 147). At point 4, the spread goes into the band (see step 144), and at point 5, the spread goes below the band, but no change in asset allocation takes place (see step 144). At point 6, the current spread re-enters the hostile environment by crossing the upper limit. At this point, the asset allocation is switched back to 100% fixed income (see step 142).

Figure 3:
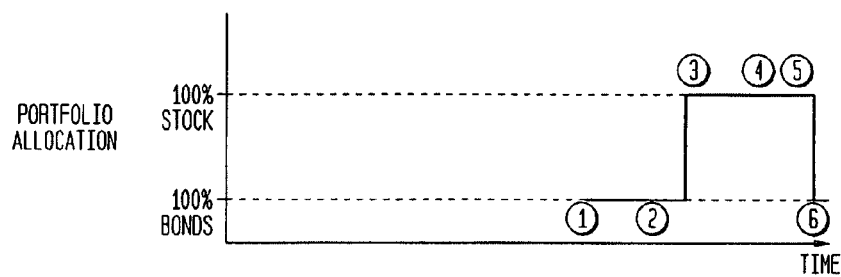
FIG. 3 is a graph which illustrates the asset allocation of FIG. 2 in accordance with the present invention.

FIG. 3 shows the asset allocation of FIG. 2 as either 100% equities or 100% fixed income securities as a function of time. As described above and as shown in FIG. 3, at point 3, the allocation is switched from 100% bonds to 100% stock. At point 6, the allocation is switched back from 100% stock to 100% bonds.

As indicated above, the inventive method (as exemplified by the foregoing) may be applied to the allocation of securities of each individual country in a fund comprised of securities from multiple emerging countries.

Finally, it should be understood that the foregoing description is merely illustrative of the invention. Numerous alternative embodiments within the scope of the appended claims will be apparent to those of ordinary skill in the art.

What is claimed is:

1. A method for allocating assets in an investment portfolio between equities and fixed income securities in one emerging market country, said method comprising the steps of:
   a) periodically determining a rolling mean value of a sovereign yield spread for said emerging market country; and
   b) switching the allocation of said investment portfolio between fixed income securities and equities such that
      (i) whenever a current sovereign yield spread of said emerging market country exceeds a first predetermined amount above said mean, substantially all of said portfolio is allocated to said fixed income securities; and
      (ii) whenever the current sovereign yield spread of said emerging market country falls below a second predetermined amount below said mean, substantially all of said portfolio is allocated to said equities;
   wherein at least one of said steps (a) and (b) is performed by a computerized system.

2. The method of claim 1, wherein said first predetermined amount is above said mean by at least one standard deviation.

3. The method of claim 1, wherein said second predetermined amount is below said mean by at least one standard deviation.

4. The method of claim 1, wherein said first and second predetermined amounts are within a range of 1 to 2 standard deviations above and below said mean, respectively.

5. The method of claim 1, wherein said fixed income securities include bonds, and wherein said equities include common stocks.

6. The method of claim 1, wherein the current sovereign yield spread and said mean are provided in units of basis points (bps).

7. The method of claim 1, wherein said portfolio further includes said securities from multiple emerging market countries, and wherein said steps (a) and (b) are applied to the allocation of assets for each individual emerging market country of said multiple countries.

8. A system for allocating assets in an investment portfolio between equities and fixed income securities in one emerging market country, said system comprising:
   a processor and a memory;
   a processor having means for periodically determining a rolling mean value of a sovereign yield spread for said emerging market country, and switching the allocation of said investment portfolio between fixed income securities and equities such that substantially all of said portfolio is allocated to said fixed income securities whenever a current sovereign yield spread of said emerging market country exceeds a first predetermined amount above said mean, and substantially all of said portfolio is allocated to said equities whenever the current sovereign yield spread of said emerging market country falls below a second predetermined amount below said mean.

9. The system of claim 8, wherein said first predetermined amount is above said mean by at least one standard deviation.

10. The system of claim 8, wherein said second predetermined amount is below said mean by at least one standard deviation.

11. The system of claim 8, wherein said first and second predetermined amounts are within a range of 1 to 2 standard deviations above and below said mean, respectively.

12. The system of claim 8, wherein said fixed income securities include bonds, and wherein said equities include common stocks.

13. The system of claim 8, wherein the current sovereign yield spread and said mean are provided in units of basis points (bps).

14. A method for allocating assets in an investment portfolio, said portfolio initially including substantially one of fixed income securities and equities, said method comprising the steps of:
   (a) periodically determining a yield spread between a first fixed income instrument and a second fixed income instrument, said yield spread being the difference in yield between the first and second fixed income instruments;
   (b) determining a mean spread based on the determined yield spread over a selected period of time;
   (c) defining a band above and below said mean spread over said selected period of time, wherein said band has an upper limit above said mean spread and a lower limit below said mean spread;
   (d) switching substantially all of said equities, in said investment portfolio, for fixed income securities whenever a current determined yield spread exceeds said upper limit of said band; and
   (e) switching substantially all of said fixed income securities, in said portfolio, for equities whenever said current determined yield spread falls below said lower limit of said band,
   wherein at least one of said steps (a), (b), (c), (d), and (e) is performed by a computerized system.

15. The method of claim 14, wherein said first fixed income instrument is a benchmark sovereign bond of a first selected country, and wherein said second fixed income instrument is a government bond of a second selected country.

16. The method of claim 15, wherein said benchmark sovereign bond is a bond of an emerging market country.

17. The method of claim 15, wherein said government bond is a United States government bond.

18. The method of claim 14, wherein said upper limit is above said mean spread by at least one standard deviation.

19. The method of claim 14, wherein said lower limit is below said mean spread by at least one standard deviation.

20. The method of claim 14, wherein said upper limit is above said mean spread by a first predetermined amount, said lower limit is below said mean spread by a second predetermined amount, and said first and second predetermined amounts are within a range of 1 to 2 standard deviations above and below said mean spread, respectively.

21. The method of claim 14, wherein said fixed income securities include bonds, and wherein said equities include common stocks.

22. The method of claim 14, wherein said yield spread, said mean spread, and said upper and lower limits of said band are provided in units of basis points (bps).

23. The method of claim 14, wherein said portfolio includes said securities from an emerging country.

24. The method of claim 14, wherein said portfolio includes said securities from multiple emerging countries, and wherein said steps (a), (b), (c), (d), and (e) are applied to the allocation of assets for each individual emerging country of said multiple countries.

* * * * *

UNITED STATES PATENT AND TRADEMARK OFFICE
CERTIFICATE OF CORRECTION

PATENT NO. : 7,240,030 B2 Page 1 of 1
APPLICATION NO. : 09/948109
DATED : July 3, 2007
INVENTOR(S) : Velez et al.

It is certified that error appears in the above-identified patent and that said Letters Patent is hereby corrected as shown below:

Column 4, Line 59, please replace "predetennined" with --predetermined--

Column 5, Line 16, please replace "detennining" with --determining--

Signed and Sealed this

Twentieth Day of November, 2007

JON W. DUDAS
*Director of the United States Patent and Trademark Office*